United States Patent
Chen et al.

(10) Patent No.: US 12,499,934 B2
(45) Date of Patent: Dec. 16, 2025

(54) MEMORY DEVICE AND METHOD OF OPERATING THE SAME

(71) Applicant: Taiwan Semiconductor Manufacturing Company, Ltd., Hsinchu (TW)

(72) Inventors: Chien-Yuan Chen, Hsinchu (TW); Che-An Lee, Keelung (TW); Hau-Tai Shieh, Hsinchu (TW); Cheng Hung Lee, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 469 days.

(21) Appl. No.: 17/685,188

(22) Filed: Mar. 2, 2022

(65) Prior Publication Data

US 2023/0282274 A1  Sep. 7, 2023

(51) Int. Cl.
*G11C 11/419* (2006.01)

(52) U.S. Cl.
CPC .................. *G11C 11/419* (2013.01)

(58) Field of Classification Search
CPC ......... G11C 11/419; G11C 5/025; G11C 7/08; G11C 7/12; G11C 16/24; G11C 16/30; G11C 7/14

See application file for complete search history.

(56) References Cited

U.S. PATENT DOCUMENTS

| | | | |
|---|---|---|---|
| 7,292,485 B1 * | 11/2007 | Lu .............................. | G11C 5/14 365/189.09 |
| 9,858,217 B1 * | 1/2018 | Marfatia ................... | G11C 7/22 |
| 10,236,055 B1 * | 3/2019 | Kumar ...................... | G11C 7/12 |
| 10,878,890 B1 * | 12/2020 | Chen ........................ | G11C 11/419 |
| 11,875,844 B2 * | 1/2024 | Lee .......................... | G11C 11/412 |
| 2008/0025103 A1 * | 1/2008 | Dudeck .................... | G11C 7/12 365/185.21 |
| 2008/0151653 A1 * | 6/2008 | Ishikura .................. | G11C 29/12 365/201 |

(Continued)

FOREIGN PATENT DOCUMENTS

| | | |
|---|---|---|
| TW | 525171 B | 3/2003 |
| TW | 201621670 A | 6/2016 |
| TW | 202207228 A | 2/2022 |

OTHER PUBLICATIONS

Taiwan Office Action issued in connection with TW Appl. Ser. No. 111116024 dated Dec. 5, 2022 (no English translation).

*Primary Examiner* — Sung Il Cho
(74) *Attorney, Agent, or Firm* — Foley & Lardner LLP

(57) ABSTRACT

A memory device and a method of operating the memory device are disclosed. In one aspect, the memory device includes a bit line connected to a plurality of memory cells of a memory array, the bit line having a first length. The memory device includes a first programmable bit line having a second length determined based on a size of the memory array, and a charge sharing circuit connected to the bit line and the first programmable bit line. The charge sharing circuit is configured to transfer a charge from the bit line to the first programmable bit line. The memory device includes a discharge circuit connected to the first programmable bit line, the discharge circuit configured to discharge a stored charge in the first programmable bit line.

20 Claims, 11 Drawing Sheets

(56) References Cited

U.S. PATENT DOCUMENTS

| | | | |
|---|---|---|---|
| 2012/0008444 A1* | 1/2012 | Parris | G11C 11/4097 |
| | | | 365/203 |
| 2012/0287693 A1 | 11/2012 | Furutani | |
| 2014/0036580 A1* | 2/2014 | Yang | G11C 7/04 |
| | | | 365/156 |
| 2015/0155021 A1* | 6/2015 | Goel | G11C 11/417 |
| | | | 365/207 |
| 2015/0311920 A1* | 10/2015 | Wang | G06F 11/1012 |
| | | | 714/764 |
| 2015/0364184 A1* | 12/2015 | Park | G11C 8/08 |
| | | | 365/156 |
| 2016/0372180 A1* | 12/2016 | Amara | G11C 11/412 |
| 2019/0080231 A1* | 3/2019 | Nestler | G11C 11/419 |
| 2019/0267096 A1 | 8/2019 | Yang et al. | |

* cited by examiner

800

802 — Provide, during a read operation of a memory cell, a first voltage to a control signal line connected to a discharge circuit and a charge sharing circuit 804 — Discharge a programmable bit line with the discharge circuit based on the first voltage on the control signal line 806 — Provide a second voltage different from the first voltage to the control signal line 808 — Connect a bit line to the programmable bit line based on the second voltage on the control signal line

FIG. 8

MEMORY DEVICE AND METHOD OF OPERATING THE SAME

BACKGROUND

A static random access memory (SRAM) device is a type of volatile semiconductor memory that stores data bits using bistable circuitry that does not need refreshing. An SRAM device typically includes one or more memory arrays, wherein each array includes a plurality of SRAM cells. An SRAM cell is typically referred to as a bit cell because it stores one bit of information, represented by the logic state of two cross coupled inverters. Each memory array includes multiple bit cells arranged in rows and columns. Each bit cell in a memory array typically includes connections to a power supply voltage and to a reference voltage. Logic signals on bit lines control reading from and writing to a bit cell, with a word line controlling connections of the bit lines to the inverters, which otherwise float. A word line may be coupled to plural bit cells along a row of a memory array, with different word lines provided for different rows.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 8 illustrates a flowchart of an example method of operating a memory device, in accordance with some embodiments.

DETAILED DESCRIPTION

Figure 1A:
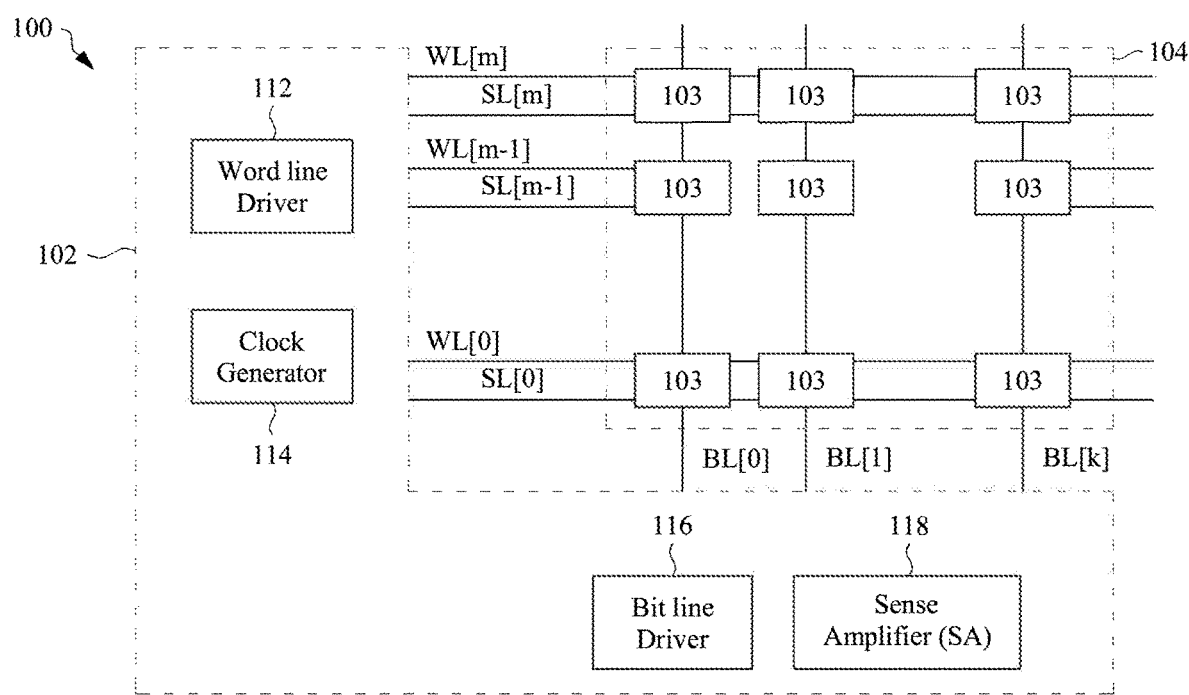
FIG. 1A illustrates a schematic block diagram of a memory device, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As integrated circuit (IC) technology advances, IC features (e.g., transistor gate length) continue to decrease, thereby allowing for more circuitry to be implemented in an IC. One challenge with the continued advancement is inconsistencies in the fabrication of memory cells at silicon process variation, operation voltage, and temperature (PVT) corners, which can impact the quality and yield of memory cells. A standard SRAM memory cell includes two cross-coupled inverters that are connected to a bit line (BL) and a bit line bar (BLB) through two access transistors. The memory cell is activated (e.g., the memory cell is access) by turning on the access transistors via a word line (WL) signal. However, if a pull-down n-type metal-oxide-semiconductor (NMOS) or pull-up p-type metal-oxide-semiconductor (PMOS) is not balanced (e.g., appropriately sized or have unbalanced resistances), the storage data of the memory cell may be disturbed during a read operation. This phenomenon is known as read static noise margin (RSNM) violation. When this occurs, current may flow from the BL/BLB through the pull-down transistors to ground, which can disturb the voltage level on the BL/BLB and cause the memory cell's datum to unintentionally flip, causing corruption in the memory cell.

Typical methods of solving this issue include several methods. A first method is to change metal scheme from double metal to single metal for the WL, which can worsen WL slew rate at high voltages to reduce a strength of the access transistor. However, this can cause signal integrity issues at high voltages. A second method includes reducing the size of the WL driver which again can worsen the WL slew rate to the access transistor strength. However, this can cause the read/write margins to be fine-tuned further and add a cut line for supporting voltage ranges. A third method includes suppressing the WL voltage which can cause the WL voltage to be reduced, reducing access transistor strength. However, similar to the second method, this can cause the read/write margins to be fine-tuned further and add a cut line for supporting voltage ranges. A fourth method includes headers for the WL driver, which can worsen the WL slew rate. However, a voltage drop in the word line may cause issues with timing and power delivery. Accordingly, there is a desire to reliably maintain a high RSNM.

In the present disclosure, a programmable charge sharing (CS) capacitor can be formed to provide several advantages over the current technology. For example, a charge sharing circuit may be used to connect the bit lines and bit line bars to programmable bit lines and programmable bit line bars. The programmable bit lines and programmable bit line bars may receive charges from the corresponding bit line or bit line bar in order to reduce the voltage on the bit line and/or bit line bar. This may substantially reduce the sudden influx of current that is provided to the pull-down transistor when the access transistor is activated. The programmable lines may be formed as metal structures that are parallel to the corresponding bit lines/bit line bars, and the programmable lines may also have varying lengths. Depending on how much charge sharing the bit line and/or the bit line bar needs, the corresponding programming bit line or bit line bar may have a length that sufficiently helps charge sharing such that the corresponding bit line and/or bit line bar may have a lower voltage than a power voltage VDD. This may advantageously result in a reduced voltage bounce at the drain of the pull-down resistor, thereby increasing the RSNM and reducing the probability of an unintentional bit flip in the memory cell.

FIG. 1A illustrates a schematic block diagram of a memory device 100, in accordance with some embodiments. A memory device is a type of an IC device. In at least one embodiment, a memory device is an individual IC device. In some embodiments, a memory device is included as a part of a larger IC device which comprises circuitry other than the memory device for other functionalities.

The memory device 100 comprises at least one memory cell 103 and a controller (also referred to as "control circuit") 102 coupled to control an operation of the memory cell 103. In the example configuration in FIG. 1A, the memory device 100 comprises a plurality of memory cells 103 arranged in a plurality of columns and rows in a memory array 104. The memory device 100 further comprises a plurality of word lines WL[0] to WL[m] extending along the rows and a plurality of bit lines (also referred to as "data lines") BL[0] to BL[k] extending along the columns of the memory cells 103. Although not shown in FIG. 1A, there can be complementing bit line bars BLB[0] to BLB[k] that extend substantially parallel to the plurality of bit lines BL[0] to BL[k]. Each of the memory cells 103 is coupled to the controller 102 by at least one of the word lines, and/or at least one of the bit lines and/or bit line bars. Examples of word lines include, but are not limited to, read word lines for transmitting addresses of the memory cells 103 to be read from, write word lines for transmitting addresses of the memory cells 103 to be written to, or the like. In at least one embodiment, a set of word lines is configured to perform as both read word lines and write word lines. Examples of bit lines include read bit lines for transmitting data read from the memory cells 103 indicated by corresponding word lines, write bit lines for transmitting data to be written to the memory cells 103 indicated by corresponding word lines, or the like. In at least one embodiment, a set of bit lines is configured to perform as both read bit lines and write bit lines. In one or more embodiments, each memory cell 103 is coupled to a pair of bit lines referred to as a bit line and a bit line bar. The word lines are commonly referred to herein as WL, and the bit lines are commonly referred to herein as BL. Various numbers of word lines and/or bit lines in the memory device 100 are within the scope of various embodiments.

In the example configuration in FIG. 1A, the controller 102 comprises a word line driver 112, a clock generator 114, a bit line driver 116, and a sense amplifier (SA) 118 which are configured to perform at least one of a read operation or a write operation. In at least one embodiment, the controller 102 further includes one or more clock generators for providing clock signals for various components of the memory device 100, one or more input/output (I/O) circuits for data exchange with external devices, and/or one or more controllers for controlling various operations in the memory device 100. In at least one embodiment, the clock generator 114 is omitted. In some embodiments, an input to the SA 118 may include a multiplexor (mux) that may receive a plurality of inputs, for example, a plurality of bit lines (and bit line bars). The controller may provide a control signal to mux so that the mux may provide a signal on the sensed bit line to the SA 118, which may provide an output signal to an I/O circuit including the I/O pad. Furthermore, there may be a plurality of SA 118 in the memory device. For example, in a memory device with 1064 columns, there may be 256 SA 118, each SA 118 having 4 bit lines that are connected to the mux which provides the selected bit line signal to the SA 118.

The word line driver 112 is coupled to the memory array 104 via the word lines WL. The word line driver 112 is configured to decode a row address of the memory cell 103 selected to be accessed in a read operation or a write operation. The word line driver 112 is configured to supply a voltage to the selected word line WL corresponding to the decoded row address, and a different voltage to the other, unselected word lines WL. In some embodiments, the word line driver 112 may include a plurality of word line drivers that are connected to groups of word lines and provide a word line signal to those word lines. For example, the number of rows in a memory device may correspond to the number of word line drivers divided by the number of the multiplexors.

The bit line driver 116 (also referred as "write driver") is coupled to the memory array 104 via the bit lines BL. The bit line driver 116 is configured to decode a column address of the memory cell 103 selected to be accessed in a read operation or a write operation. The bit line driver 116 is configured to supply a voltage to the selected bit line BL corresponding to the decoded column address, and a different voltage to the other, unselected bit lines BL. In a write operation, the bit line driver 116 is configured to supply a write voltage (also referred to as "program voltage") to the selected bit line BL. In a read operation, the bit line driver 116 is configured to supply a read voltage to the selected bit line BL.

The SA 118 is coupled to the memory array 104 via the bit lines BL. In a read operation, the SA 118 is configured to sense data read from the accessed memory cell 103 and retrieved through the corresponding bit lines BL. The described memory device configuration is an example, and other memory device configurations are within the scopes of various embodiments. In at least one embodiment, the memory device 100 is volatile memory, and the memory cells 103 are SRAM memory cells. Other types of memory are within the scopes of various embodiments. Example memory types of the memory device 100 include, but are not limited to, SRAM, dynamic random access memory (DRAM), or the like.

The transistors in this disclosure are shown to have a certain type (n-type or p-type), but embodiments are not limited thereto. The transistors can be any suitable type of transistor including, but not limited to, metal oxide semiconductor field effect transistors (MOSFET), complementary metal oxide semiconductors (CMOS) transistors, P-channel metal-oxide semiconductors (PMOS), N-channel metal-oxide semiconductors (NMOS), bipolar junction transistors (BJT), high voltage transistors, high frequency transistors, P-channel and/or N-channel field effect transistors (PFETs/NFETs), FinFETs, planar MOS transistors with raised source/drains, nanosheet FETs, nanowire FETs, or the like.

In some embodiments, the controller 102 includes the word line driver 112, clock generator 114, bit line driver 116, and SA 118, as well as a plurality of other circuits such as one or more multiplexors, one or more pass gate transistors (or pass transistors), and/or one or more level shifters, where each of these other circuits can include p-type or n-type transistors. The multiplexors, the pass gate transistors, the SA 118, and the level shifters can be generally disposed on opposing sides of the word line driver 112, clock generator 114, and/or bit line driver 116. The controller 102 can be disposed on the substrate and connected to the memory array 104 through one or more bit lines BL, and/or one or more word lines WL that can be disposed in one or more metallization layers and/or one or more via structures.

In some embodiments, a row may be defined as a number of word line drivers divided by a number of mux inputs to the SA 118, and a number of columns may be defined as a number of I/O pads multiplied by the number of mux inputs. However, embodiments are not limited thereto.

Figure 1B:
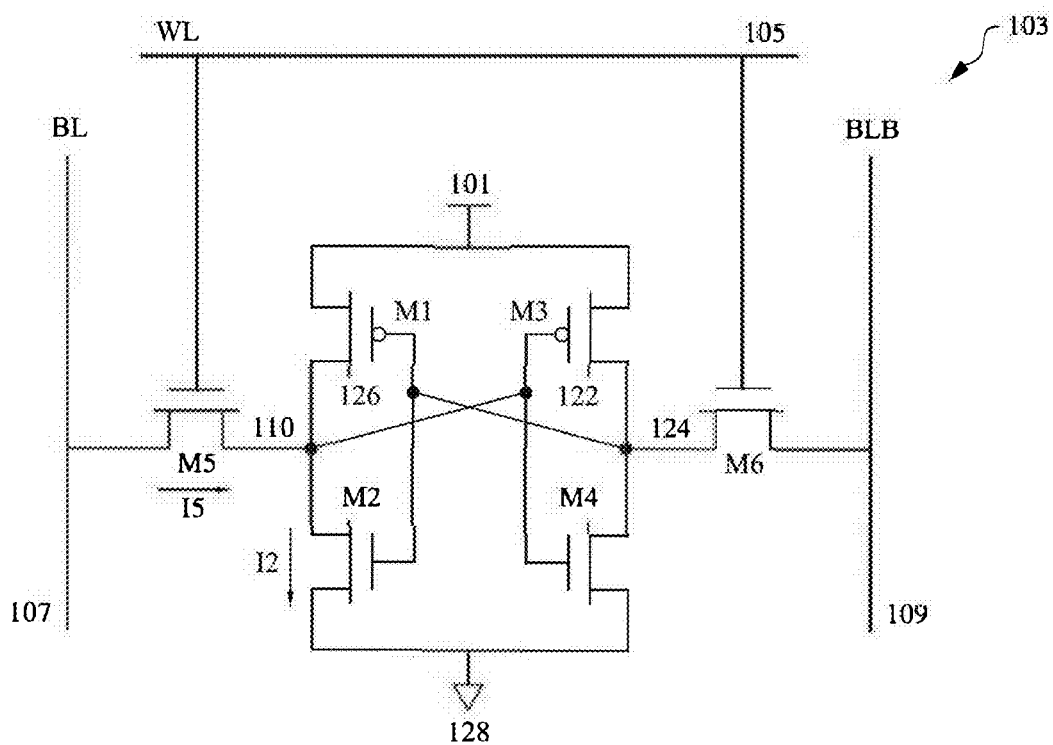
FIG. 1B illustrates an example circuit diagram of a memory cell, in accordance with some embodiments.

FIG. 1B illustrates an example circuit diagram of a memory cell 103, in accordance with some embodiments. The memory cell 103 includes six transistors that form a 6T SRAM memory cell. In some embodiments, the memory cell 103 may be implemented as any of various other SRAM cells such as, for example, a two-transistor-two-resistor (2T-2R) SRAM cell, a four-transistor (4T)-SRAM cell, an eight-transistor (8T)-SRAM cell, a ten-transistor (10T)-SRAM cell, etc. Although the discussion of the current disclosure is directed to an SRAM cell, it is understood that other embodiments of the current disclosure can also be used in any of other memory cells such as, for example, dynamic random access memory (DRAM) cells.

As shown in FIG. 1B, the memory cell 103 includes 6 transistors: M1, M2, M3, M4, M5, and M6. The transistors M1 and M2 are formed as a first inverter and the transistors M3 and M4 are formed as a second inverter, wherein the first and second inverters are cross coupled to each other. Specifically, the first and second inverters are each coupled between first voltage reference 101 and second voltage reference 128. In some embodiments, the first voltage reference 101 is a voltage level of a supply voltage applied to the memory cell 100, which is typically referred to as "VDD." The second voltage reference 128 is typically referred to as "ground." The first inverter (formed by the transistors M1 and M2) is coupled to the transistor M5, and the second inverter (formed by the transistors M3 and M4) is coupled to the transistor M6. In addition to being coupled to the first and second inverters, the transistors M5 and M6 are each coupled to a word line (WL) 105 and are coupled to a bit line (BL) 107 and a bit line bar 109 (BLB), respectively.

In some embodiments, the transistors M1 and M3 are referred to as pull-up transistors of the memory cell 103 (hereinafter "pull-up transistor M1" and "pull-up transistor M3," respectively); the transistors M2 and M4 are referred to as pull-down transistors of the memory cell 103 (hereinafter "pull-down transistor M2" and "pull-down transistor M4," respectively); and the transistors M5 and M6 are referred to as access transistors of the memory cell 103 (hereinafter "access transistor M5" and "access transistor M6," respectively). In some embodiments, the transistors M2, M4, M5, and M6 each includes an n-type metal-oxide-semiconductor (NMOS) transistor, and M1 and M3 each includes a p-type metal-oxide-semiconductor (PMOS) transistor. Although the illustrated embodiment of FIG. 1B shows that the transistors M1-M6 are either NMOS or PMOS transistors, any of a variety of transistors or devices that are suitable for use in a memory device may be implemented as at least one of the transistors M1-M6 such as, for example, a bipolar junction transistor (BJT), a high-electron-mobility transistor (HEMT), etc.

The access transistors M5 and M6 each has a gate coupled to the WL 105. The gates of the transistors M5 and M6 are configured to receive a pulse signal, through the WL 105, to allow or block an access of the memory cell 103 accordingly, which will be discussed in further detail below. The transistors M2 and M5 are coupled to each other at node 110 with the transistor M2's drain and the transistor M5's source. The node 110 is further coupled to a drain of the transistor M1 and node 122. The transistors M4 and M6 are coupled to each other at node 124 with the transistor M4's drain and the transistor M6's source. The node 124 is further coupled to a drain of the transistor M3 and node 126.

When a memory cell (e.g., the memory cell 103) stores a data bit, a first node of the bit cell is configured to be at a first logical state (either a logical 1 or a logical 0), and a second node of the bit cell is configured to be at a second logical state (either a logical 0 or a logical 1). The first and second logical states are complementary with each other. In some embodiments, the first logical state at the first node may represent the logical state of the data bit stored in the memory cell. For example, in the illustrated embodiment of FIG. 1B, when the memory cell 103 store a data bit at a logical 1 state, the node 110 is configured to be at the logical 1 state, and the node 124 is configured to be at the logical 0 state.

To read the logical state of the data bit stored in the memory cell 103, the BL 107 and BLB 109 are pre-charged to VDD (e.g., a logical high). Then the WL 105 is asserted, or activated, by an assert signal to a logical high, which turns on the access transistors M5 and M6. Specifically, a rising edge of the assert signal is received at the gates of the access transistors M5 and M6, respectively, so as to turn on the access transistors M5 and M6. Once the access transistors M5 and M6 are turned on, based on the logical state of the data bit, the pre-charged BL 107 or BLB 109 may start to be discharged. For example, when the memory cell 103 stores a logical 0, the node 110 may present a voltage corresponding to the logical 0, and the node 124 may present a voltage corresponding to the complementary logical 1. In response to the access transistors M5 and M6 being turned on, a discharge path, starting from the pre-charged BL 107, through the access transistor M5 and pull-down transistor M2, and to ground 128, may be provided. Along the discharge path, the access transistor M5 and the pull-down transistor M6 may conduct current I5 and current I2, respectively. While the voltage level on the BL 107 is pulled down by such a discharge path, the pull-down transistor M4 may remain turned off. As such, the BL 107 and the BLB 109 may respectively present a voltage level to produce a large enough voltage difference between the BL 107 and BLB 109. Accordingly, the SA 118, coupled to the BL 107 and BLB 109, can use a polarity of the voltage difference to determine whether the logical state of the data bit is a logical 1 or a logical 0.

The RSNM is the SNM that exists when connecting the WL and the BL/BLB to VDD during a read operation. When the WL is turning on (or being activated), the node that stores the logical 0 may be in the middle of a voltage divider (e.g., between the transistors M5 and M2 or between the transistors M6 and M4). Accordingly, this "read disturb" drawback may draw current from the BL through the transistors M5 and M2 to the reference 128 or from the BLB through the transistors M6 and M4 to the reference 128. During a read or write operation, half-selected memory cells 103 along the selected WL 105 experience dummy read operations. And because of the read disturb, there is a risk of the storage datum in the half-selected memory cells 103 experiencing an unintentional bit flip if the voltage changed along the BL and BLB caused by the read disturb is higher than the RSNM. In advance processes, bit cell (or memory cell 103) mismatches become larger which contribute to noise voltage at the node 110 or 124. When process at fast NMOS with slow PMOS or fast NMOS with fast PMOS (FS/FF) with high temperature and high voltage, the read disturb may cause a cell flipped with a strong pull-down transistors M2 or M4. For example, at high temperatures and higher mismatches, the RSNM is lowered, which increases the risk of the unintentional bit flips.

For example, at the beginning of a read operation of the memory cell 103, the node 110 may have a logic 0 (e.g., 0V) and the node 124 may have a logic 1 (e.g., VDD). And the BL and the BLB may have been pre-charged to, e.g., VDD. When the transistor M5 is turned on, the charge stored on the BL flows through the transistor M5 and towards the node 110. The influx of charge causes a voltage bounce at node 110 from 0V to some voltage greater than 0V. If the bounce at the node 110 is high enough, it can cause the inverter including the transistors M3 and M4 to transition the output at node 124 from VDD to 0V, causing an unintentional bit flip. Accordingly, there is a desire to keep the voltage bounce at node 110 low.

Various existing methods of fixing this issue are inadequate. For example, raising the supply voltage of the SRAM cell by adding a boost cap is inadequate because the pull-up PMOS transistors are also strengthened which can cause the ability to write a datum into the SRAM cell during a write operation. As another example, slowing the rising edge of voltage level on the WL by sizing down the WL driver may cause degradation of performance as well as the ability to write into the memory cell at low voltages and low temperatures. Furthermore, the cells at the end of the WL may suffer additional performance degradation and read margin impact. Furthermore, designing different sizes for the WL driver leads to greater design efforts and suffer higher performance, power, and/or area (PPA) degradation. Accordingly, there is a need to reduce the risk of the unintentional bit flip due to RSNM violation without suffering in terms of PPA.

Figure 2A:
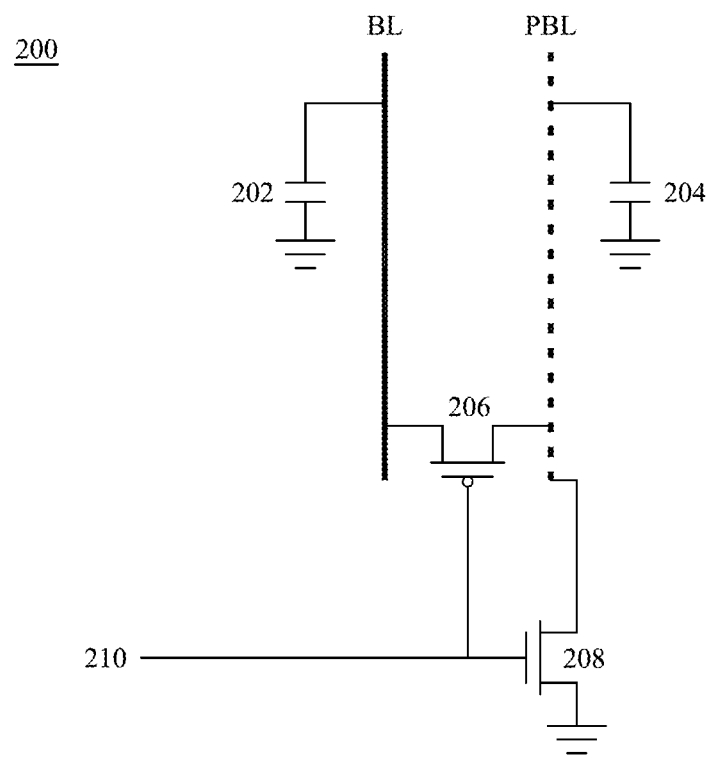
FIG. 2A illustrates an example programmable charge sharing circuit, in accordance with some embodiments.

FIG. 2A illustrates an example programmable CS circuit 200, in accordance with some embodiments. The programmable CS circuit 200 includes programmable bit line (PBL) (or charge sharing bit line or CSBL), a CS transistor (or CS sub-circuit) 206, and a discharge transistor (or discharge circuit) 208. The PBL may be schematically represented as a PBL capacitor (PBLC) 204 which may include a parasitic capacitor. The CS transistor 206 and discharge transistor 208 may both be controlled by a control signal provided on the control signal line 210, although embodiments are not limited thereto. The programmable CS circuit 200 is connected to a bit line BL which has a parasitic capacitor 202. Although certain circuit components are shown in FIG. 2A, embodiments are not limited thereto, and more, fewer, or different components may be provided for the programmable CS circuit 200. It should be appreciated that various modifications may be made to the programmable CS circuit 200 within the spirit of this disclosure. Furthermore, although not shown or described separately, the disclosed technology may be applied to a BLB as well, not just the BL. For example, a programmable CS circuit 200 may be disposed adjacent to the BLB as well so that occurrences of an unintentional bit flip caused by a BLB voltage bounce may be reduced or eliminated. Therefore, similar descriptions are omitted for simplicity and clarity.

Typically, in integrated circuit chips including memory devices, metal structures within metal layers ML0, ML2, ML4, and ML6 (and potentially others) (even-numbered metal layers), for example, may be substantially parallel to one another, and metal structures within metal layers ML1, ML3, ML5, and ML7 (and potentially others) (odd-numbered metal layers) may be substantially parallel to one another. The metal structures formed in even-numbered metal layers may be formed substantially perpendicularly to metal structures formed in the odd-numbered metal layers. Accordingly, by forming via holes filled with conductive material at locations where the even-numbered metal layers overlap the odd-numbered metal layers, electronic components may be electrically connected to one another even if they are disposed separately from one another.

The PBL (and PBLC 204) may be formed as a metal structure in a metal layer in the memory device. If the bit line BL of the memory device is formed as a metal structure in metal layer ML0, the PBL may be formed as a metal structure in an even-numbered metal layer, e.g., metal layer ML2, ML4, or ML6. If the bit line BL is formed as a metal structure in metal layer ML1, the PBL may be formed as a metal structure in an odd-numbered metal layer, e.g., metal layer ML3, ML5, or ML7.

When the memory device (e.g., memory device 100) is fabricated, the memory device may include a set of PBLs having the same length and disposed parallel to the BLs. However, different memory device sizes may result in different lengths of the PBL. For example, there may be a PBL that has a length that is the same or substantially the same as the BL for a first memory device with a high number of WL drivers and a small number of I/O pads. A second memory device may have a PBL that is about ½ of the length of the BL if the second memory device has a fewer number of WL drivers than the first memory device but the same number of I/O pads. Furthermore, the length of the PBL may be smaller (e.g., ⅛ of BL length) for a third memory device that has the same number of WL drivers as the first memory device and a greater number of I/O pads than both the first and second memory devices. Still further, the PBL length may be smaller (e.g., 1/32 of BL length) for a fourth memory device that has fewer WL drivers than the first and third memory devices but more I/O pads than the second memory device. Accordingly, the length of the PBL may decrease with fewer [WD] WL drivers and more I/O pads. Similarly, there may be a PBL that is about ¼, about ⅛, about 1/16, or about 1/32 of the length of the BL. Depending on how long the PBL is relative to the BL, a capacitance of the PBLC 204 may vary. For example, the longer the PBL is, the greater the capacitance may be for the PBLC 204. Although certain lengths and ratios for the PBL are described with respect to the BL, embodiments are not limited thereto, and the length of the PBL may be any length that is less than, equal to, or greater than the BL.

The CS transistor 206 has source and drain (S/D) terminals that may be connected to the BL and the PBL. When the CS transistor 206 is turned on, an electric charge that is stored on the BL (and the parasitic capacitor 202) may be shared with the PBL and charge the PBLC 204. The CS transistors 206 may be controlled by a control signal on the control signal line 210. The CS transistor 206 may be programmable based on how long the CS transistor 206 is turned on. For example, if the CS transistor 206 is turned on for a short charge sharing period, less CS may be occur between the BL and the PBLC 204, and if the CS transistor 206 is turned on for a long CS period, more CS may occur between BL and the PBLC 204 such that the charge stored on the BL and the PBLC 204 are similar. Accordingly, by considering the charge rate of the PBL, the CS transistor 206 may provide a desired amount of charge from the BL.

The discharge transistor 208 may be turned on to discharge the electric charge on the PBLC 204 to ground. The discharging may be performed, for example, before the PBL receives the charge from the BL via the CS transistor 206.

In some embodiments, the CS transistor 206 includes a PMOS transistor, and the discharge transistor includes an NMOS transistor. Accordingly, when the discharge transistor 208 is turned on, the CS transistor 206 may be turned off. And when the discharge transistor 208 is turned off, the CS transistor 206 may be turned on. However, embodiments are not limited thereto, and the CS transistor 206 may include an NMOS transistor or any combination of circuit components that can collectively share charge from the BL to the PBLC 204. Similarly, the discharge transistor 208 may include a PMOS transistor or any combination of circuit components that can collectively discharge the charge on the PBLC 204 to ground.

A controller (e.g., controller 102) may provide the control signal for the control signal line 210. The controller may calculate a charge sharing period including how long to turn on/off the CS transistor 206 and the discharge transistor 208. A charge sharing amount may be dependent on, for example, how many WL drivers and/or how many input/output (I/O) pads there are on the memory device. The CS amount may depend on the number of WL drivers and I/O pads because differently sized memory devices (e.g., memory device 100) may be more prone to a stronger and/or higher voltage bounce than others.

For example, if there are 1024 WL drivers and 8 I/O pads on a memory device, the memory device may be prone to more voltage bounce. Accordingly, the PBL length may be set to be similar to the length of the BL for this memory device. On the other hand, if there are 240 WL drivers and 72 I/O pads in a memory device, the memory device may be less prone to the voltage bounce than the memory device with 1024 WL drivers and 8 I/O pads. Accordingly, the 240×72 memory device may include PBLs that are have a ratio that is less (e.g., the PBL length is ¼ of the BL length). As another example, if a memory device has 1024 WL drivers and 144 I/O pads, this memory device may be less prone to voltage bounce than the 240×72 memory device. This memory device may have a PBL that has a smaller ratio (e.g., PBL length may be ⅛ of the BL length). As a further example, if a memory device has 240 WL drivers and 144 I/O pads, the PBL length may be ¹⁄₃₂ of the length of the BL because this memory device is even less prone to voltage bounce. Accordingly, the controller may charge share a BL with a PBL having a length that depends on which WL driver and I/O pad the memory cell is that the controller is reading from. Therefore a memory device may be designed to have a PBL length that is dependent on the size of the memory device, which may maximize the performance of the memory device during read operations. Accordingly, the charge stored on the BL may be reduced so that the voltage bounce that occurs at the node 110 (of FIG. 1B) may be reduced, which can increase the RSNM and eliminate unintentional bit flips.

Figure 2B:
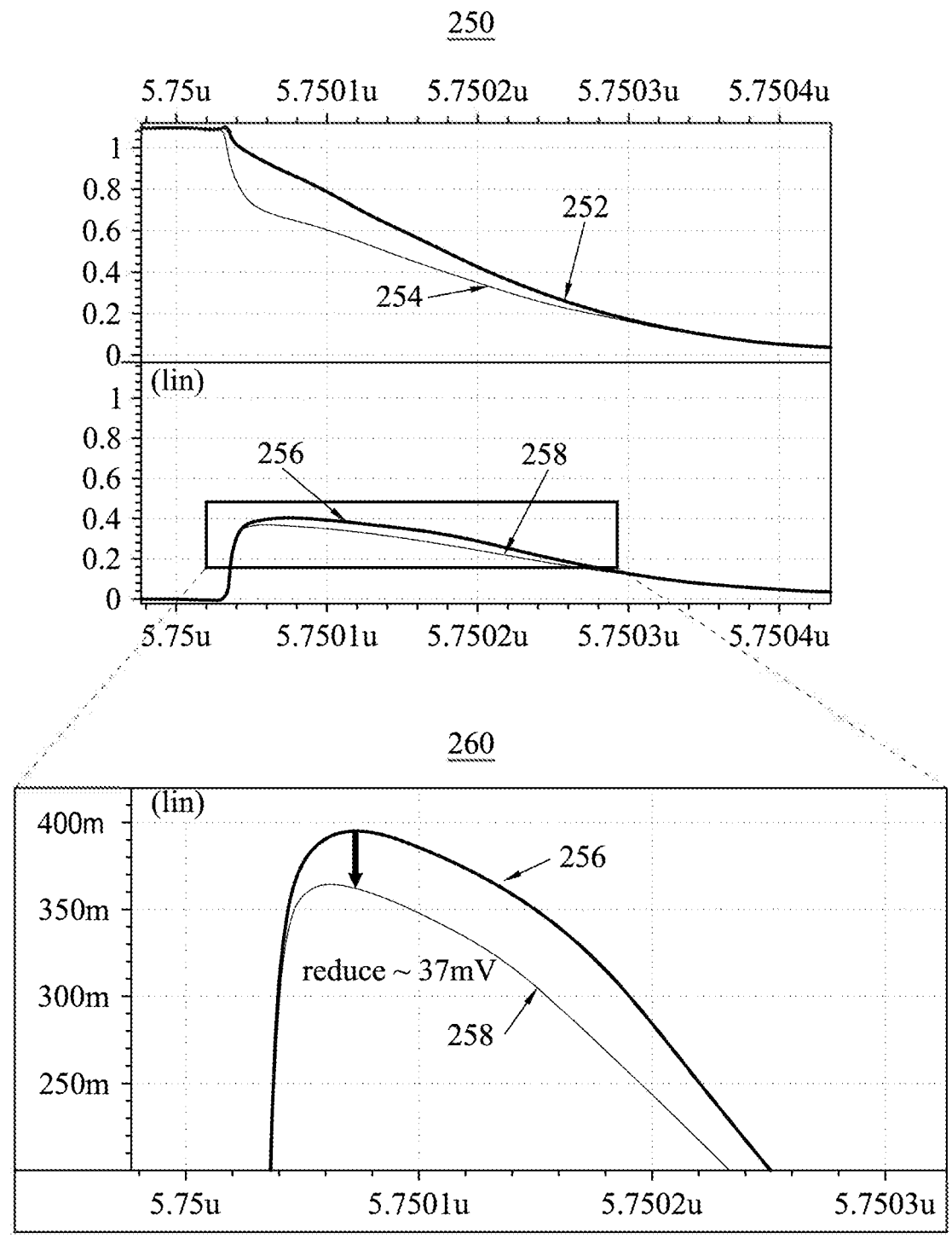
FIG. 2B illustrates example waveforms presenting an effect of using the programmable charge sharing circuit of FIG. 2A during a read operation, in accordance with some embodiments.

FIG. 2B illustrates example waveforms that help show an effect of using the programmable charge sharing circuit of FIG. 2A during a read operation, in accordance with some embodiments. Graph 250 includes several waveforms 252, 254, 256, and 258 at different nodes of the memory cell (e.g., memory cell 103), and graph 260 is a detailed view of a portion of the graph 250. The x-axes of the graphs 250 and 260 corresponds to time, and the y-axes corresponds to voltage. Waveforms 252 and 254 are interposed over each other to show the difference. Similarly, waveforms 256 and 258 are interposed over each other. Furthermore, waveforms 252 and 254 are placed above the waveforms 256 and 258 to show the voltage at the different nodes that occur at the same point (e.g., after the pre-charge is completed) in the read operation. One of ordinary skill will recognize that the waveforms are shown as an example, and embodiments are not limited thereto.

Waveform 252 is measured at the BL (e.g., BL of memory cell 103) without a programmable charge sharing circuit. Waveform 254 is measured at the BL (e.g., BL of memory cell 103) with, for example, the programmable charge sharing circuit 200. Waveform 256 is measured at a voltage divider node (e.g., node 110) between the access transistor (e.g., transistor M5) and the pull-down transistor (e.g., transistor M2), without the programmable charge sharing circuit. And waveform 258 is measured at a voltage divider node (e.g., node 110) between the access transistor (e.g., transistor M5) and the pull-down transistor (e.g., transistor M2), with the programmable charge sharing circuit 200.

Waveform 252 has voltage measurements that is greater than the voltage measurements of the waveform 254 at the same point in time of the read operation. Accordingly, as shown in waveform 256, the voltage measurement at the voltage divider node is greater than the voltage measurement at the voltage divider node of waveform 258.

As shown in the detailed graph 260, the memory device including the programmable charge sharing circuit (shown in waveform 258) has a voltage measurement that is about 37 mV less than the voltage measurement of a memory device without the programmable charge sharing circuit (shown in waveform 256). Because the voltage at the voltage divider node is reduced, the memory cell has an increased RSNM, which may reduce and/or eliminate a possibility of having an unintentional bit flip.

Figure 3:
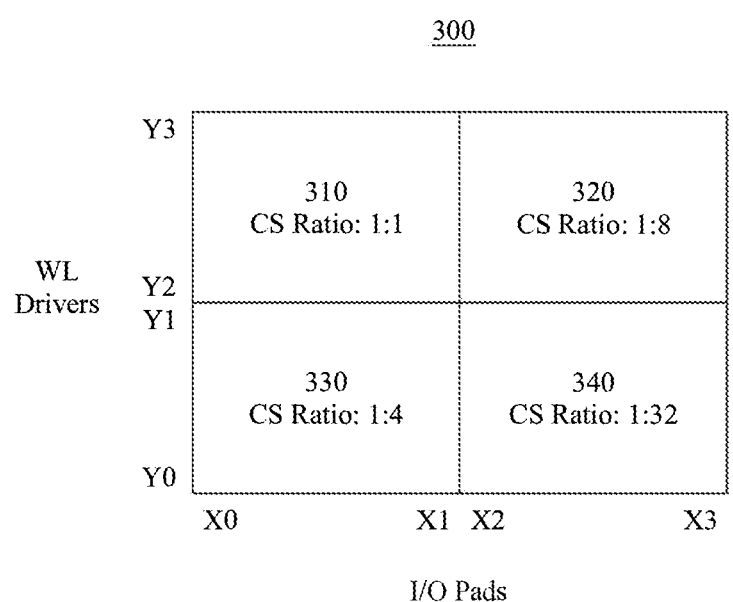
FIG. 3 illustrates an example charge sharing tile matrix of charge sharing ratios, in accordance with some embodiments.

FIG. 3 illustrates an example CS tile matrix 300 of CS ratios, in accordance with some embodiments. The x-axis corresponds to a number of I/O pads on a memory device (e.g., memory device 100), and the y-axis corresponds to a number of WL drivers of the memory device. As discussed above, the length of the PBL, which may determine how much charge-sharing occurs, may depend on the number of WL drivers and the number of I/O pads of the memory device. In this disclosure, the terms memory array and memory device are used interchangeably to indicate the matrix of memory cells that are arranged in WL drivers and I/O pads.

The CS tile matrix 300 may include a plurality of tiles with different boundaries that depend on the number of WL drivers and the number of I/O pads. For example, tile 310 may indicate that for all memory arrays having Y2 to Y3 number of WL drivers and X0 to X1 number of I/O pads, the CS ratio may be 1:1, meaning the PBL may be as long as the BL. Tile 320 may indicate that for all memory arrays having Y2 to Y3 number of WL drivers and X2 to X3 number of I/O pads, the CS ratio may be 1:8, meaning the PBL length may be ⅛ of the BL length. Tile 330 may indicate that for all memory arrays having Y0 to Y1 number of WL drivers and X0 to X1 number of I/O pads, the CS ratio may be 1:4, meaning the PBL length may be ¼ of the BL length. Tile 340 may indicate that for all memory arrays having Y0 to Y1 number of WL drivers and X2 to X3 number of I/O pads, the CS ratio may be 1:32, meaning the PBL length may be 1/32 of the BL length.

Although the CS tile matrix 300 includes four tiles, embodiments are not limited thereto, and any number of tiles and configurations may be contemplated. For example, there may be more or fewer tiles in the x-direction or the y-direction. Furthermore, the tiles may have non-quadrilateral shapes. For example, a chip designer may decide that a tiles may include a variety of shapes such as rectangles, hexagons, circular, etc. depending on how the chip designer chooses to design the memory array and how much charge sharing may occur for that memory array.

Figure 4A:
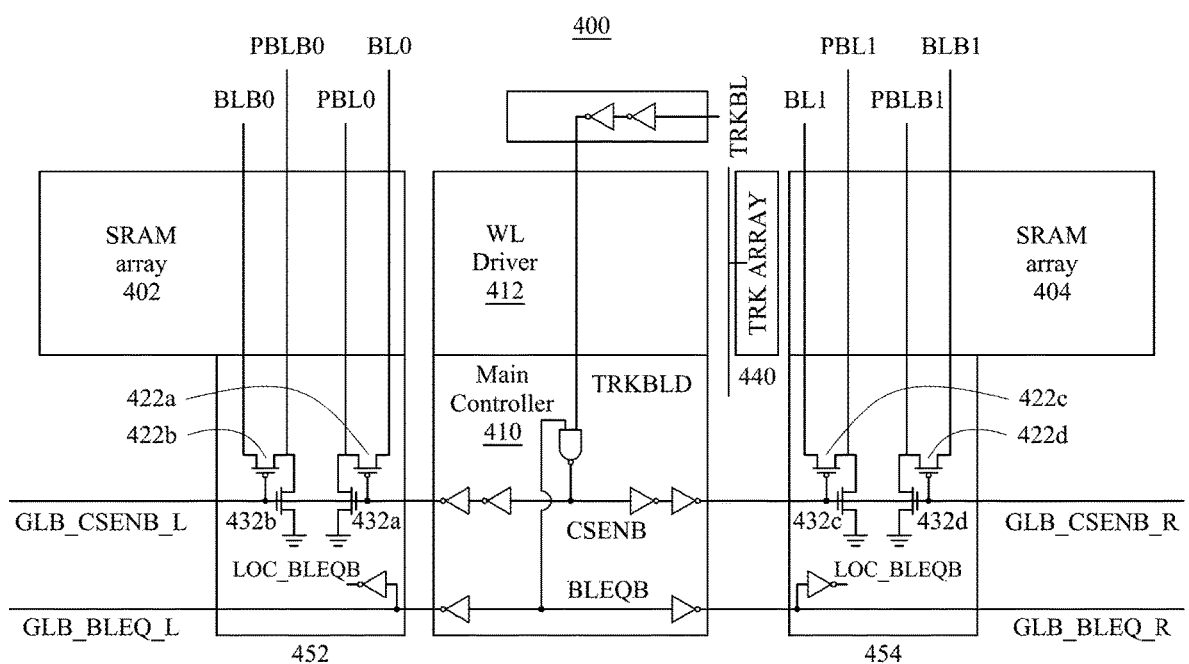
FIG. 4A illustrates an example block diagram of a memory device, in accordance with some embodiments.

FIG. 4A illustrates an example block diagram of a memory device 400, in accordance with some embodiments. The memory device 400 includes memory arrays 402 and 404, a WL driver 412 (e.g., WL driver 112), a tracking array 440, a main controller 410, and input/output (I/O) circuits 452 and 454. The WL driver 412, the main controller 410, and/or the tracking array 440 can be collectively called the controller (e.g., controller 102) in the present disclosure. One of ordinary skill will recognize that the example block diagram in FIG. 4A does not include several signal lines and/or circuits that can be implemented as part of the memory device 400 and these signal lines and/or circuits have been omitted for clarity and simplicity.

The memory arrays 402 and 404 can include arrays of SRAM memory cells (e.g., memory cell 103) that are arranged in WL drivers and I/O pads. The memory arrays 402 and 404 can be disposed on opposing sides of the word line driver 412.

Various circuits and signal lines can be used to model and/or track a memory array so that the main controller 410 can accurately and timely generate signals for the operation of memory device 400. For example, the tracking array 440 can include an array (or I/O pad) of SRAM memory cells that is used for timing tracking of the memory device 400 via a TRKBL signal output to the main controller 410 so that the main controller 410 can know when to trigger certain clock and/or control signal edges. For example, the TRKBL signal line can mimic a bit line in the SRAM memory array 402 and 404 such that the TRKBL signal can rise and fall based on a condition of the SRAM memory arrays 402 and 404. For example, the TRKBL signal may trigger when a CKPB signal may rise and fall, as will be described in further detail below.

The main controller 410 can be connected to the WL driver 412. The main controller 410 can receive the TRKBL signal delayed as a TRKBLD signal to generate a charge sharing enable CSENB signal, which may be used to provide the control signal for, e.g., the control signal line 210 of FIG. 2A. For example, the charge sharing enable signal CSENB may be delayed by inverter buffers to generate a GLB_CSENB_L signal for the SRAM array 402 and a GLB_CSENB_R signal for the SRAM array 404. The CSENB signal may be generated with a NAND gate that receives as input the TRKBLD signal and a BLEQB signal, which is the signal that controls/enables a pre-charging of the BL/BLB. The BLEQB signal may be input into an inverter that can be used to generate a global BLEQB signal (e.g., GLB_BLEQ_L for the SRAM array 402 and GLB_BLEQ_R for the SRAM array 404) that gets routed to all of the I/O circuits. Within each I/O circuit, a local BLEQB signal LOC_BLEQB signal may be generated that gets used for the pre-charge circuit within the I/O circuit. The CSENB signal may be delayed using a buffer (e.g., a plurality of inverters connected in series) as shown in FIG. 3. Although certain circuit components are shown as being used to generate certain signals, embodiments are not limited thereto, and a variety of other circuit components or a combination of circuit components may be used to generate the same or similar signals. For example, the CSENB signal may be delayed using more than two inverters (e.g., 4, 6, etc.) as a buffer.

Each of the I/O circuits 452 and 454 can include, among other things, sense amplifiers (e.g., SA 118). The I/O circuits 452 and 454 can receive as input including, for example, input data and a write enable signal and as output read data from the memory cells in the SRAM arrays 402 and 404. Although not shown, one of ordinary skill will recognize that a plurality of I/O circuits may be disposed adjacent to the SRAM array 402 and SRAM array 404 so that data may be written into or read from the memory cells. Further, a position number of the I/O pad relative to the main controller 410 may increase and correspond to x-axis of the matrix 300 of FIG. 3. For example, the I/O circuit 452 which is closest to the main controller 410 may be X0 on the x-axis of the matrix 300, and an I/O circuit disposed at the far left (not shown) may represent X3 on the x-axis. Similarly, the I/O circuit 454 which is closest to the main controller 410 may be X0 on the x-axis of the matrix 300, and an I/O circuit disposed at the far right (not shown) may represent X3 on the x-axis.

The I/O circuit 452 may include CS transistors 422a and 422b (e.g., CS transistor 206) and discharge transistors 432a and 432b (e.g., discharge transistor 208). The CS transistor 422a can be connected to the bit line BL0 (e.g., BL from FIG. 2A) and the programmable bit line PBL0 (e.g., PBL from FIG. 2A), and the CS transistor 422b can be connected to the bit line bar BLB0 (e.g., the BLB which is opposite to the BL of FIG. 2A) and the programmable bit line bar PBLB0 (e.g., a programmable BLB which is opposite to the PBL of FIG. 2A). The I/O circuit 454 may include CS transistors 422c and 422d (e.g., CS transistor 206) and discharge transistors 432c and 432d (e.g., discharge transistor 208). The CS transistor 422c can be connected to the bit line BL1 (e.g., BL from FIG. 2A) and the programmable bit line PBL1 (e.g., PBL from FIG. 2A), and the CS transistor 422d can be connected to the bit line bar BLB1 (e.g., the BLB which is opposite to the BL of FIG. 2A) and the programmable bit line bar PBLB1 (e.g., a programmable BLB which is opposite to the PBL of FIG. 2A). Similar descriptions are not repeated for the sake of simplicity and clarity.

Figure 4B:
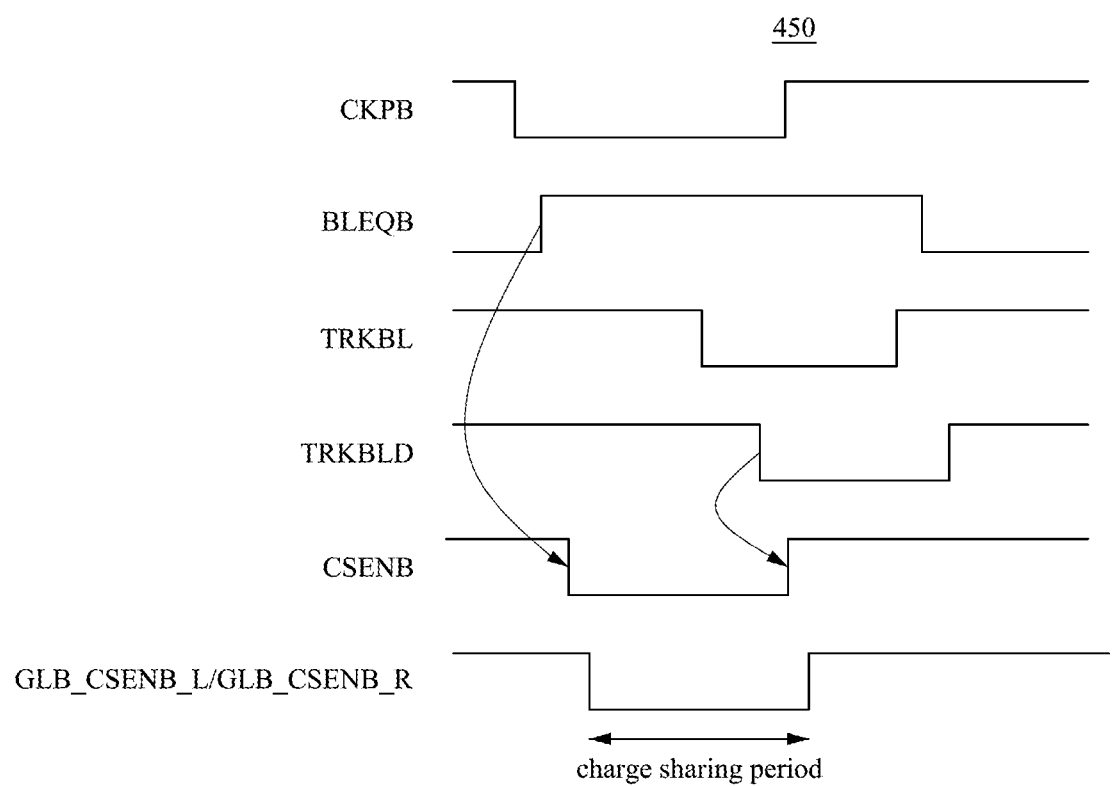
FIG. 4B illustrates a timing diagram of an example operation of the memory device of FIG. 4A, in accordance with some embodiments.

FIG. 4B illustrates a timing diagram 450 of an example operation of the memory device 400, in accordance with some embodiments. The clock signal CKPB may include a clock signal used by the SRAM array to store, read, and retain data. The BLEQB signal may be similar to the BLEQB signal from FIG. 4A, the TRKBL signal may be similar to the TRKBL signal from FIG. 4A, the TRKBLD signal may be similar to the TRKBLD signal from FIG. 4A, and the CSENB signal may be similar to the CSENB signal from FIG. 4A. The GLB_CSENB_L and GLB_CSENB_R signals may be respectively similar to the GLB_CSENB_L and GLB_CSENB_R signals that provide a control signal to the discharge transistors and charge sharing transistors.

The timing diagram 450 shows positive and negative edges of various signals which also shows how the charge sharing period may be determined. As shown in FIG. 4A, the pre-charge enable signal BLEQB and the delayed BL tracking signal TRKBLD may be input into a NAND circuit to generate the charge sharing enable signal CSENB. The CSENB may be delayed by a buffer to generate the GLB_CSENB_L and GLB_CSENB_R signals.

Accordingly, the charge sharing may begin (e.g., CSENB rises) when the pre-charging of the BL stops (e.g., BLEQB rises), and the charge sharing may stop when the BL tracking signal TRKBL is low enough for the voltage bounce to not cause an unintentional bit flip. In some embodiments, the LOC_BLEQB rising may be earlier than GLB_CSENB_L/R falling. In some embodiments, the GLB_CSENB_L/R rising may be earlier than LOC_BLEQB falling. In some embodiments, the BLEQB falling may be earlier than TRKBLD rising. Accordingly, the charge sharing period may be determined by when the pre-charge stops and a voltage of the TRKBL signal drops.

In some embodiments, for higher voltages, the charge sharing may be made to a lower voltage. For example, if VDD is 1.5V, the amount that a charge sharing occurs may increase compared to if the VDD is 1.1V. Furthermore, a pre-charge circuit may include p-type transistors that are cross-coupled with the BL and BLB to be pre-charged by the p-type transistors. If the BLB drops too much due to charge sharing while reading a logic 0 in the memory cell, the drop in voltage the BLB may cause the cross-coupled p-type transistor to turn on such that the voltage in the BL is increased to logic 0 due to voltage drop in the BLB being greater than a threshold voltage of the p-type transistor (e.g., for 3 nm node, a cross-coupled p-type MOS transistor's threshold voltage is about 350 mV to about 400 mV). Accordingly, during a reading of logic 0 in the memory cell, the charge sharing for the BLB and PBLB may be less.

Figure 5:
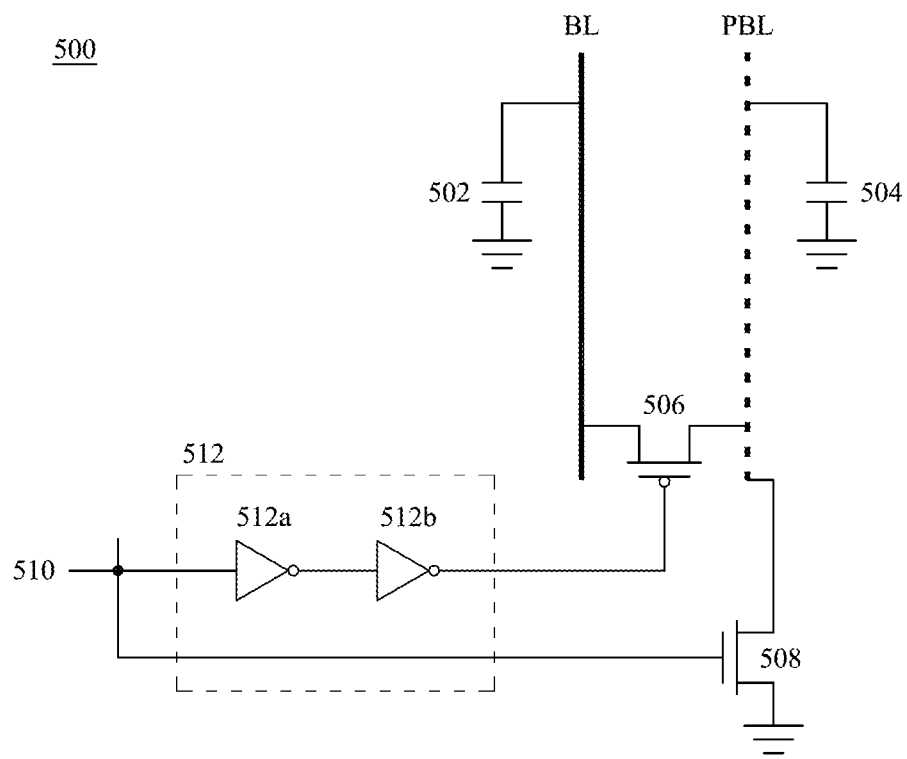
FIG. 5 illustrates an example programmable charge sharing circuit, in accordance with some embodiments.

FIG. 5 illustrates an example programmable CS circuit 500, in accordance with some embodiments. The programmable CS circuit 500 is similar to the programmable CS circuit 200 except that the programmable CS circuit 500 includes a delay chain 512 including inverters 512a and 512b. For example, a parasitic capacitor 502 is similar to the parasitic capacitor 202, a PBLC 504 is similar to the PBLC 204, a CS transistor 506 is similar to the CS transistor 206, a discharge transistor 508 is similar to the discharge transistor 208, and a control signal is similar to the control signal 510. Accordingly, similar description is omitted.

The delay chain 512 may add a delay to the control signal being transmitted to the charge sharing transistor 506. This may allow the discharge transistor 508 to discharge the PBL (and PBLC 504) to discharge longer. This may be advantageous to equalize a gate delay between a signal path for CS transistor 506 and a signal path for the discharge transistor 508. Although the delay chain 512 shows two inverters 512a and 512b, embodiments are not limited thereto and more than two inverters may be contemplated, depending on how much delay needs to be added to match the gate delays between the two signal paths. Similarly, a delay chain may be added to the other signal path (e.g., signal path for the discharge transistor 508).

Figure 6:
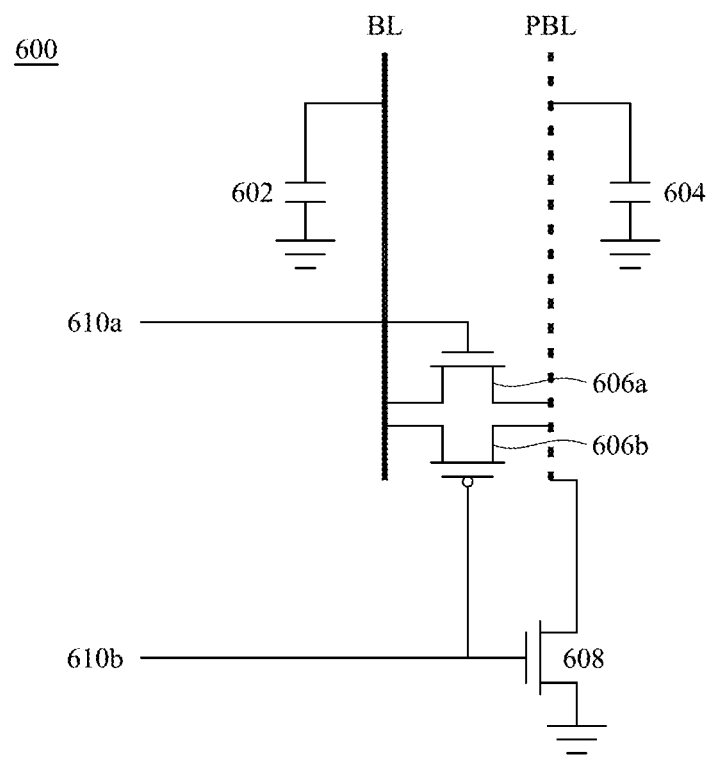
FIG. 6 illustrates an example programmable charge sharing circuit, in accordance with some embodiments.

FIG. 6 illustrates an example programmable CS circuit 600, in accordance with some embodiments. The programmable CS circuit 600 is similar to the programmable CS circuit 200 except that the programmable CS circuit 600 includes a CMOS transistors to charge share between the BL and the PBL (instead of only one PMOS transistor in programmable CS circuit 200) using complementary control signals 610a and 610b (instead of only one control signal 210 in programmable CS circuit 200). For example, a parasitic capacitor 602 is similar to the parasitic capacitor 202, a PBLC 604 is similar to the PBLC 204, and a discharge transistor 608 is similar to the discharge transistor 208. Accordingly, similar description is omitted.

When an NMOS transistor 606a and a PMOS transistor 606b is used to charge share between the BL and the PBL, the charge sharing may occur faster. The control signal 610a may be complementary to the control signal 610b. For example, an inverter may be added such that the two signals are opposite from each other to control the NMOS and PMOS transistors 606a and 606b.

Figure 7:
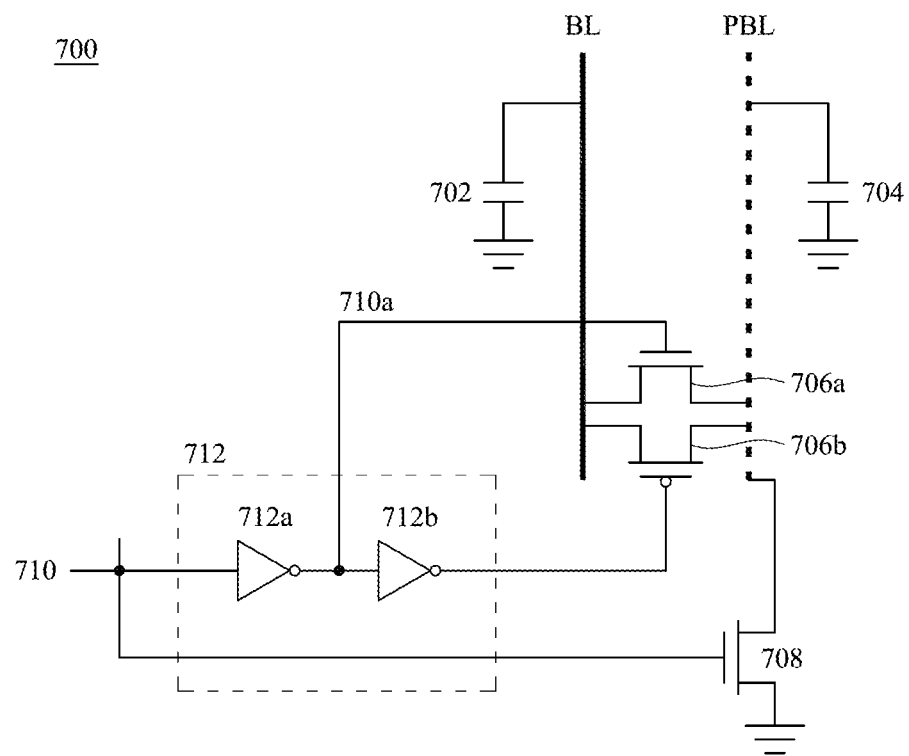
FIG. 7 illustrates an example programmable charge sharing circuit, in accordance with some embodiments.

FIG. 7 illustrates an example programmable CS circuit 700, in accordance with some embodiments. The programmable CS circuit 700 is similar to the programmable CS circuit 200 except that the programmable CS circuit 700 includes a delay chain 712 including inverters 712a and 712b and that the programmable CS circuit 700 includes an NMOS transistor 706a and PMOS transistor 706b as charge sharing transistors (instead of one PMOS charge sharing transistor 206 in programmable CS circuit 200). For example, a parasitic capacitor 702 is similar to the parasitic capacitor 202, a PBLC 704 is similar to the PBLC 204, a CS transistor 706 is similar to the CS transistor 206, a discharge transistor 708 is similar to the discharge transistor 208, and a control signal is similar to the control signal 710. Accordingly, similar description is omitted.

The delay chain 712 may add a delay to the control signal being transmitted to the charge sharing transistor 706. This may allow the discharge transistor 708 to discharge the PBL (and PBLC 704) to discharge longer. This may be advantageous to equalize a gate delay between a signal path for CS transistor 706 and a signal path for the discharge transistor 708. Although the delay chain 712 shows two inverters 712a and 712b, embodiments are not limited thereto and more than two inverters may be contemplated, depending on how much delay needs to be added to match the gate delays between the two signal paths. Similarly, a delay chain may be added to the other signal path (e.g., signal path for the discharge transistor 708).

When an NMOS transistor 706a and a PMOS transistor 706b is used to charge share between the BL and the PBL, the charge sharing may occur faster. The control signal 710a may be complementary to the control signal 710b. For example, an inverter may be added such that the two signals are opposite from each other to control the NMOS and PMOS transistors 706a and 706b. Furthermore, the NMOS transistor 706a may be gated by a control signal 710a that is output from the inverter 712a. Accordingly, by combining the delay chain 712 and the CMOS charge sharing transistors with the control signal 710a, an area of the memory device may be reduced.

Referring to FIGS. 2A and 5-7, each of the embodiments described in this disclosure may include a PBL or multiple PBLs that may be formed as a metal structure in any of the metal layers M0-M7. Similarly, the PBL with which the programmable CS circuit 200, 500, 600, or 700 connects with can depend on which CS ratio the user chose which may depend on which WL driver and I/O pad the memory cell is disposed.

FIG. 8 illustrates a flowchart of an example method 800 of operating a memory device, in accordance with some embodiments. The method 800 may be used to reduce a voltage bounce within the memory cell to increase a RSNM and reduce a probability of an unintentional bit flip within the memory cell. It is noted that the method 800 is merely an example and is not intended to limit the present disclosure. Accordingly, it is understood that additional operations may be provided before, during, and after the method 800 of FIG. 8, and that some other operations may only be briefly described herein.

In brief overview, the method 800 starts with operation 802 of providing, during a read operation of a memory cell, a first voltage to a control signal line connected to a discharge circuit and a charge sharing circuit. The method 800 proceeds to operation 804 of discharging a programmable bit line with the discharge circuit based on the first voltage on the control signal line. The method 800 proceeds to operation 806 of providing a second voltage different from the first voltage to the control signal line. The method 800 proceeds to operation 808 of connecting a bit line to the programmable bit line based on the second voltage on the control signal line.

Referring to operation 802, during a read operation of a memory cell (e.g., memory cell 103), a controller (e.g., controller 102) may provide a first voltage (e.g., a turn-on voltage such as a logic high or power supply voltage VDD) to a control signal line (e.g., control signal line 210) that is connected to a discharge circuit (e.g., discharge transistor 208) and a charge sharing circuit (e.g., charge sharing transistor 206). A bit line may be pre-charged to a certain pre-charge voltage (e.g., VDD, VDD/2, etc.) prior to the provision of the first voltage to the control signal line.

Referring to operation 804, based on the provision of the first voltage to the control signal line, the discharge circuit may discharge a charge on a programmable bit line (e.g., PBL). The PBL may have a length that is similar to the bit line or a length that is different than the bit line.

Referring to operation 806, the controller may provide a second voltage (e.g., turn-off voltage, 0V, etc.) that is different than the first voltage to the control signal line.

Referring to operation 808, based on the second voltage on the control signal line, the charge sharing circuit may turn on electrically connect the bit line to the PBL. When the bit line is connected to the PBL, a portion of charge that was on the BL during the pre-charge period may be transferred to the PBL. Once a charge sharing period is completed, the charge sharing circuit may be turned off such that no further charge is transferred from the bit line to the PBL.

Accordingly, at the end of the charge sharing period, the bit line may have an amount of charge (and a voltage) that is less than the pre-charged amount. Due to a reduction of charge on the bit line, when an access transistor of the memory cell is turned on, a rush of charge from the bit line to the pull-down transistor is reduced, and the voltage bounce is reduced. Accordingly, an unintentional bit flip in the memory cell may be prevented.

In one aspect of the present disclosure, a memory device is disclosed. The memory device includes a bit line connected to a plurality of memory cells of a memory array, the bit line having a first length. The memory device includes a first programmable bit line having a second length determined based on a size of the memory array, and a charge sharing circuit connected to the bit line and the first programmable bit line. The charge sharing circuit is configured to transfer a charge from the bit line to the first programmable bit line. The memory device includes a discharge circuit connected to the first programmable bit line, the discharge circuit configured to discharge a stored charge in the first programmable bit line.

In another aspect of the present disclosure, a memory system is disclosed. The memory system includes a memory array including a bit line having a first length, a controller configured to provide a control signal to the memory array, and a programmable charge sharing circuit connected to the controller and the bit line. The programmable charge sharing circuit includes a first programmable bit line having a second length determined based on a size of the memory array and a charge sharing circuit connected to the bit line and the first programmable bit line. The charge sharing circuit is configured to transfer a charge from the bit line to the first programmable bit line. The programmable charge sharing circuit also includes a discharge circuit connected to the first programmable bit line, the discharge circuit configured to discharge a stored charge in the first programmable bit line.

In yet another aspect of the present disclosure, a method for operating a memory device is disclosed. The method includes providing, during a read operation of a memory cell, a first voltage to a control signal line connected to a discharge circuit and a charge sharing circuit, discharging a programmable bit line with the discharge circuit based on the first voltage on the control signal line, providing a second voltage different from the first voltage to the control signal line, and connecting a bit line to the programmable bit line based on the second voltage on the control signal line.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
a bit line connected to a plurality of memory cells of a memory array, wherein the bit line has a first length;
a first programmable bit line having a second length determined based on a number of word line (WL) drivers and a number of input/output (I/O) pads coupled to the memory array;
a charge sharing circuit connected to the bit line and the first programmable bit line, wherein the charge sharing circuit is configured to transfer a charge from the bit line to the first programmable bit line; and
a discharge circuit connected to the first programmable bit line, wherein the discharge circuit is configured to discharge a stored charge in the first programmable bit line.

2. The memory device of claim 1, wherein the charge sharing circuit includes a p-type transistor including a gate terminal connected to a control line.

3. The memory device of claim 2, wherein the discharge circuit includes an n-type transistor including a gate terminal connected to the control line.

4. The memory device of claim 1, wherein the bit line is formed as a first metal structure, and wherein the first programmable bit line is formed as a second metal structure that is substantially parallel to the first metal structure.

5. The memory device of claim 4, wherein the first length and second length are the same.

6. The memory device of claim 4, wherein the first length and second length are different.

7. The memory device of claim 6, wherein the second length is longer for the memory array having a first number of rows that is greater than a second number of rows, and wherein the second length is longer for the memory array having a first number of columns that is greater than a second number of columns.

8. The memory device of claim 1, wherein the charge sharing circuit includes a p-type transistor and an n-type transistor connected in parallel, wherein a first control signal is connected to the p-type transistor, and wherein a second control signal being inverted from the first control signal is connected to the n-type transistor.

9. The memory device of claim 1, further comprising a plurality of inverters connected to a gate terminal of the charge sharing circuit, wherein a control signal is connected to the input of the plurality of inverters and a gate terminal of the discharge circuit.

10. The memory device of claim 9, wherein the charge sharing circuit includes a p-type transistor and an n-type transistor connected in parallel, and wherein a gate terminal of the n-type transistor is connected to an output of a first inverter and an input to a second inverter.

11. A memory system, comprising:
a memory array including a bit line having a first length;
a controller configured to provide a control signal to the memory array; and
a programmable charge sharing circuit connected to the controller and the bit line, the programmable charge sharing circuit comprising:
  a first programmable bit line having a second length determined based on a number of word line (WL) drivers and a number of input/output (I/O) pads coupled to the memory array;
  a charge sharing circuit connected to the bit line and the first programmable bit line, wherein the charge sharing circuit is configured to transfer a charge from the bit line to the first programmable bit line; and
  a discharge circuit connected to the first programmable bit line, wherein the discharge circuit is configured to discharge a stored charge in the first programmable bit line.

12. The memory system of claim 11, further comprising a tracking circuit configured to track a behavior of the bit line and provide a tracking signal to the controller, wherein the controller is configured to generate the control signal based on the tracking signal.

13. The memory system of claim 12, further comprising a pre-charge circuit configured to pre-charge the bit line based on a pre-charge control signal from the controller, wherein the controller includes a NAND gate configured to receive the tracking signal and the pre-charge control signal as inputs and output the control signal.

14. The memory system of claim 11, wherein the programmable bit line is disposed parallel to the bit line.

15. The memory system of claim 14, wherein the bit line is formed as a first metal structure, and wherein the first programmable bit line is formed as a second metal structure that is substantially parallel to the first metal structure.

16. The memory system of claim 15, wherein the first programmable bit line is disposed in a first region of the memory array, wherein the memory system further comprises a second programmable bit line, and wherein the first programmable bit line is longer than the second programmable bit line.

17. The memory system of claim 11, wherein the memory array includes a plurality of static random access memory (SRAM) cells.

18. A memory device, comprising:
a bit line connected to a plurality of memory cells of a memory array, wherein the bit line has a first length;
a first programmable bit line having a second length determined based on a number of word line (WL) drivers and a number of input/output (I/O) pads coupled to the memory array;
a charge sharing circuit connected to the bit line and the first programmable bit line, wherein the charge sharing circuit is to transfer a charge from the bit line to the first programmable bit line; and
a discharge circuit connected to the first programmable bit line, wherein the discharge circuit is to discharge a stored charge in the first programmable bit line.

19. The memory device of claim 18, wherein the charge sharing circuit includes a p-type transistor including a gate terminal connected to a control line.

20. The memory device of claim 19, wherein the discharge circuit includes an n-type transistor including a gate terminal connected to the control line.

* * * * *